Dec. 27, 1966    C. N. SKINNER    3,293,748
PHYSIOLOGIC METHOD AND APPARATUS FOR DETERMINING
MANDIBULAR RELATIONS
Filed Feb. 24, 1959    2 Sheets-Sheet 1
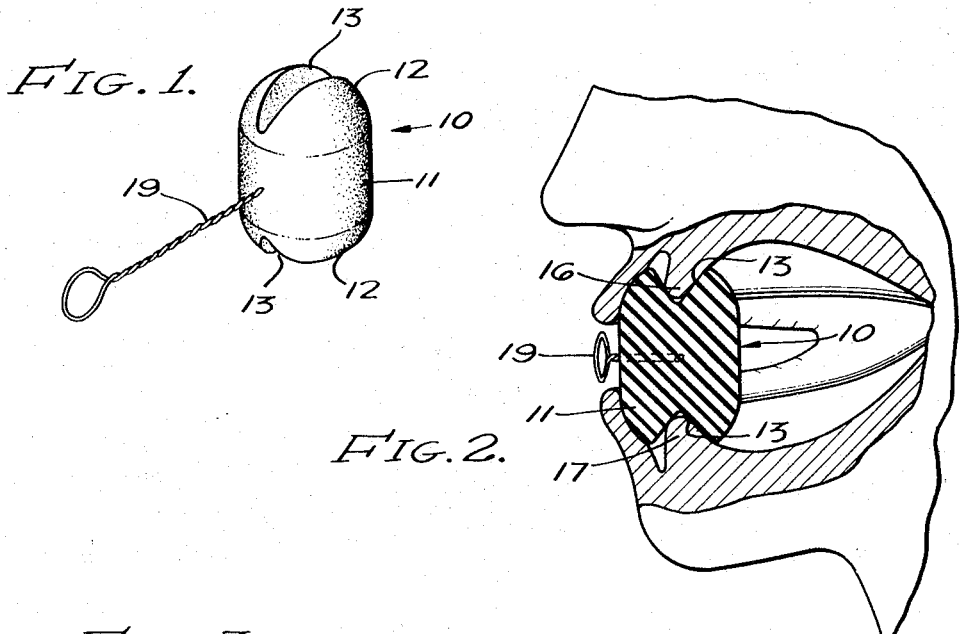
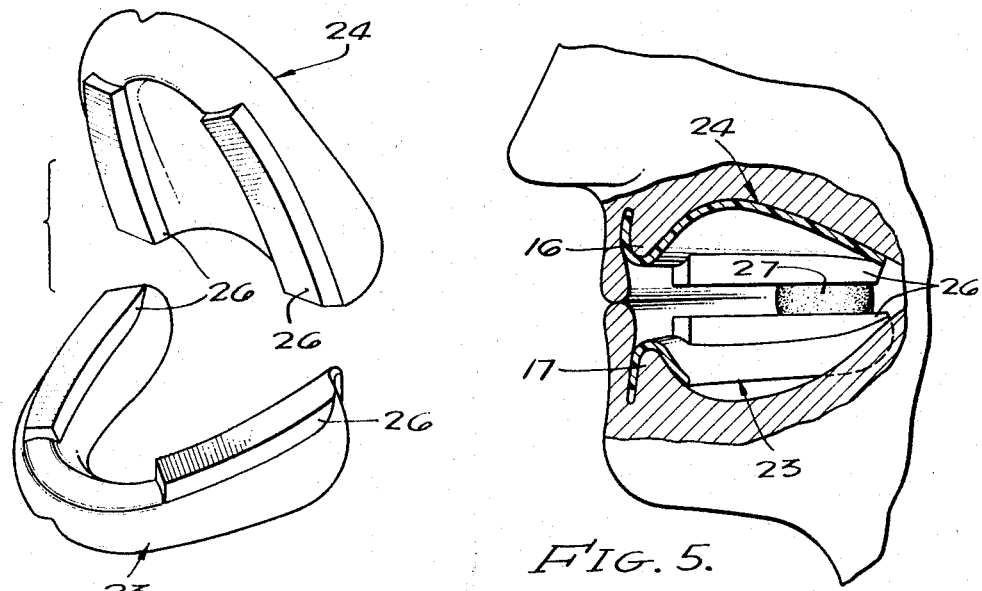
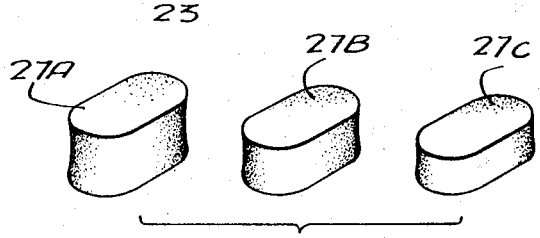
CLAWSON N. SKINNER
INVENTOR.
BY
ATTORNEY

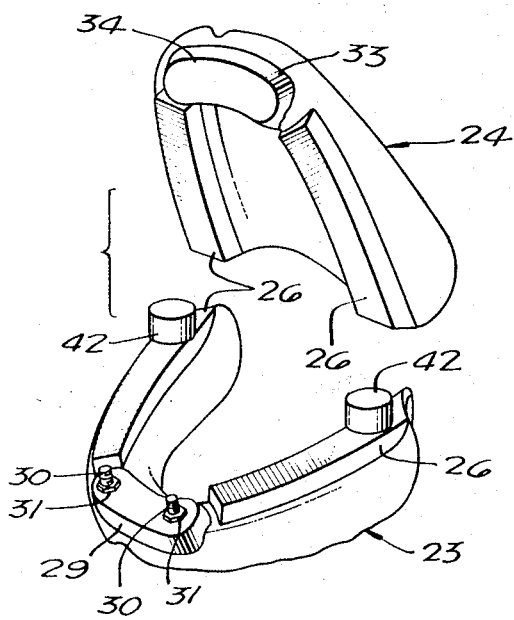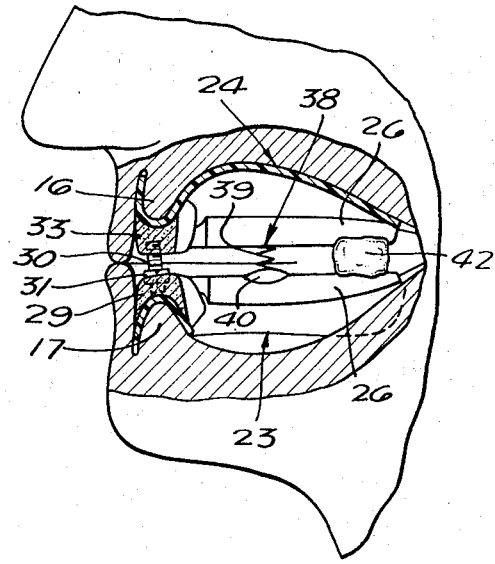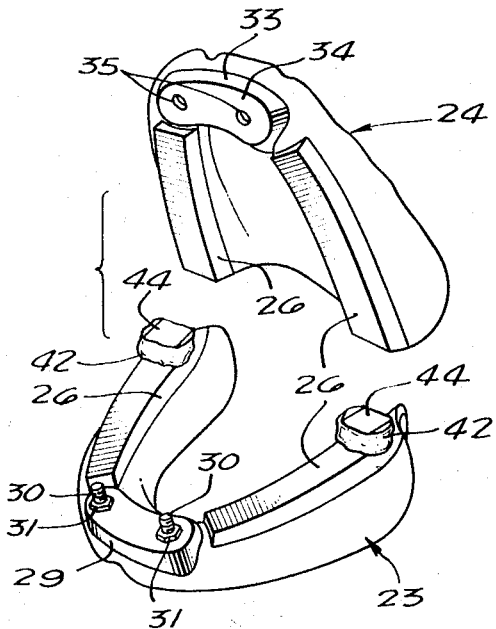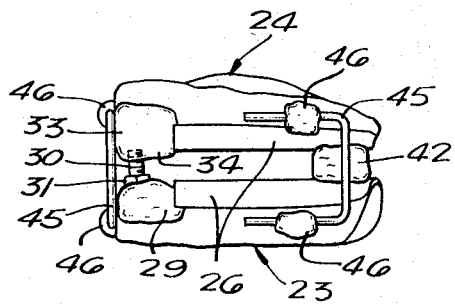

United States Patent Office 3,293,748
Patented Dec. 27, 1966

3,293,748
PHYSIOLOGIC METHOD AND APPARATUS FOR
DETERMINING MANDIBULAR RELATIONS
Clawson N. Skinner, 2018 El Rey Drive,
Whittier, Calif. 90606
Filed Feb. 24, 1959, Ser. No. 802,589
9 Claims. (Cl. 32—19)

This invention relates to methods and apparatus adapting artificial dentures and more particularly to an improved physiologic method and apparatus for determining mandibular relations and recording these with precision preliminary to the fabrication of dentures vastly superior in adaptability and comfort to any heretofore known.

The crucial importance of having functional stresses and the natural occlusal pressure between natural maxillary and mandibular teeth equalized and coordinated with artificial dentures is well known. The lack of absolute harmony prevents normal and proper functioning of the dentures, causes mild to extreme discomfort for the patient, interferes with proper eating habits, and can lead to serious secondary effects such as change in the facial features as well as both muscle and bone dystrophy. Existence of these conditions serves to augment the maladjustment and malfunctioning of the dentures.

In properly adapted dentures the occlusal pressure is not only maintained at the precise value required for the individual patient's maximum comfort, but this pressure is equalized over the whole supportive area of the juxtaposed occlusal surfaces, a factor which aids materially in preventing soreness, changes in facial features, bone dystrophy and occlusal disharmony. Stated differently, properly adjusted dentures are harmonious to the patient's physiologic and neurologic structure.

The neural muscular system controlling the operation of the mandible comprises a muscle complex. The elements of this complex controlling mastication include multiple sets of muscle couplets, one portion of which is fully extended when the other portion is fully contracted, a third portion being in balance with the movement of the mandible. These muscle couplets are substantially developed to be in harmony with the mandible as related to the maxilla and are characterized by substantially zero adaptability to function harmoniously under other than normal bite conditions. Thus during closing of the jaw, the muscle couplets shorten and lengthen to establish isotonic conditions. Thereafter isometric contraction occurs wherein the power requisite for mastication is applied without any substantial change in muscle length. Any condition antagonistic to these isotonic and isometric conditions interferes with the proper and comfortable manipulation of the neural muscular complex associated with the jaw and its use. It is for this reason that slight wearing of the teeth or even the slightest misfit in dentures can result in mild to severe discomfort, muscle and bone dystrophy, and can seriously interfere with eating habits.

Another characteristic of the neural muscular complex is the speed with which muscular atrophy develops in the absence of exercise and the application of normal load stresses to all components of the complex. For example, the loss of one or more teeth is coupled with the lack of opposition to the associated elements of the neural complex with the result that atrophy of the associated muscle couplets begins to develop immediately. The resulting adverse effects can be arrested and counteracted provided prompt steps are taken to restore normal load conditions on the affected muscles. It is of crucial importance that atrophied elements of the neural complex and of the associated neural system be substantially restored to a normal, healthy condition. Before attempts are made to measure normal mandibular relations, restoration of the neural muscular system is important, the failure to recognize this step being a principal cause of malfitting dentures and the resulting discomfort and other consequences heretofore experienced.

According to the present invention, it has been found that full restoration of either weak or atrophied elements of the neuro-muscular can be accomplished in a highly satisfactory manner by the use of a device herein termed a muscle conditioner and neurological activator constructed and used in the manner hereinafter disclosed. In one preferred form this activator comprises a manipulating handle attached to a generally dumb-bell shaped element of soft rubber or the like adapted to straddle the gums at the site of one or more missing teeth. This activator is so shaped that the normal closing of the jaw compresses the body of the activator thereby applying slight pressure to all surfaces of the gum adjacent the missing tooth to exercise the tissues and stimulate blood flow. The resulting increased blood flow throughout the affected gum areas supplies plentiful quantities of oxygen and nutrients to the tissues and promotes their rapid nourishment and recovery.

After atrophied areas have been massaged and stimulated for a sufficient period to establish positive reactivation of the neuro-muscular mechanism and tissues, the patient is asked to chew artificial food or bolus to the end that the entire neuro-mechanism can be more vigorously exercised as nearly normally as possible under sufficiently high load conditions to assure speedy restoration of normal healthy conditions. The time required in carrying out this second phase of muscle restoration by the use of bolus is dependent on the degree of atrophy, the general state of the patient's health, and the degree of cooperation evidenced by the patient.

Once examination establishes that the normal healthy condition of the gums and of the associated muscles and neural system has been restored, it is possible to make high precision measurements of true mandibular relations required before properly fitting and functioning dentures can be made. The technique and mechanical aids employed in performing this critical task, according to the present invention, will be described under the most extreme and difficult of conditions, namely, in situations where all teeth are missing and normal reference points are entirely lacking. The means provided for establishing true mandibular relations to the maxilla is accomplished, according to this invention, by the aid of a pair of conventional base plates, one shaped to seat on the upper alveolar ridge and the other to seat on the lower alveolar ridge. The manner in which these plates are prepared to conform accurately to the juxtaposed surface areas of the mouth is well known to the art.

There remains the problem of measuring the vertical height, preferably at three properly selected points between the upper and lower base plates. Desirably, these points are selected to lie to either side of the jaw toward the rear of the base plates with the third reference point selected centrally of the forward portion of the mouth. The measuring expedients employed include means for making the measurements under conditions controlled by the patient with the aid of a signalling mechanism automatically advising the patient when he closes his toothless jaws to a normal relationship. In a preferred form, the signalling expedient comprises a pair of springs positioned on either side of the jaw between opposed portions of the upper and lower base plates and having an accurately measured height as determined by the size of artificial bolus, it being understood that the particular heights of the spring indicator selected for use are accurately related to the diameter of food bolus providing the most comfortable chewing conditions when gripped between the opposed areas of the upper and lower base plates of the recorder. Once the proper heights of the spring indicators have been found and these springs have been accurately installed, wax bites or the like may be taken in a manner to be described herein and effective to record accurately the vertical heights between the two base plates. These wax bites are taken while the patient holds the mandible and the maxilla in normally closed position as determined by the stylus as the patient senses contact of the stylus with the wax. The springs act to seat the base plates against their supporting surfaces in the mouth under diastolic blood pressure conditions. The patient then holds this position accurately until the wax media has taken a firm set. The two base plates are locked closed in accurately related relation by the aid of three rigid locking links secured to the opposite rear edges of the base plates and across the front in a manner to be described.

In view of the foregoing, it is a primary object of the present invention to provide a physiologic method and apparatus for determining mandibular relations with a high degree of precision and reliability.

Another object of the invention is the provision of an improved method and apparatus for establishing mandibular relations and including as an essential prerequisite a technique for restoring as far as possible the normal, healthy condition of any and all parts of the mandibular and maxilla muscular complex despite decreased muscular tone or conditions of dystrophy and atrophy.

Another object of the invention is the provision of a muscle conditioner and neurological activator adapted to be used by the patient to initiate a return of inactive elements of the mandibular and maxilla muscular complex toward normal utilizing the efforts of the patient to apply massaging pressure to temporarily inactive muscle couplets and associated supportive tissues.

Another object of the invention is to provide an improved muscle conditioner, blood flow stimulator and neurologic activator so shaped and constructed as to apply patient-controlled distributed pressure resiliently to gum areas at and surrounding one or more missing teeth.

Another object of the invention is the provision of variegated artificial bolus composed of resilient impervious material adapted to withstand chewing and mastication in gum areas from which teeth are missing and effective in supplementing and augmenting the action of the muscle conditioner and neurological activator in restoring toward normal, healthy condition of temporarily inactive muscle couplets associated with the missing teeth.

Another object of the invention is the provision of recording apparatus and technique for establishing with precision the proper vertical heights between the maxilla and the mandible following the full restoration of normal neuro muscular conditions.

Another object of the invention is the provision of recording apparatus and an improved technique for establishing with high precision the relation of the mandible in its anterior and posterior relations relative to the maxilla and including the related free way space.

These and other more specific objects will appear upon reading the following specification and claims and upon considering in connection therewith the attached drawings to which they relate.

Referring now to the drawings in which a preferred embodiment of the invention is illustrated:

FIGURE 1 is a perspective view of a muscle conditioner and neurologic activator according to the present invention;

FIGURE 2 is a side view of a patient's face with portions broken away to show the activator of FIGURE 1 in its normal operating position between the alveolar ridges after the teeth have been extracted;

FIGURE 3 is a perspective view of companion base plates used in determining mandibular relations after the teeth have been extracted;

FIGURE 4 is a perspective view of several sizes of artificial bolus;

FIGURE 5 is a view similar to FIGURE 2 but showing the companion base plates positioned in the patient's mouth and the chewable bolus in position therebetween;

FIGURE 6 is a perspective view similar to FIGURE 3 but showing the companion base plates prepared for use in recording accurately true mandibular relations;

FIGURE 7 is a view similar to FIGURE 6 but showing impressions in the wax recorder devices and indicative of the normal masticating position of the maxillary and the mandible;

FIGURE 8 is a cross-sectional view similar to FIGURE 5 showing the jaw closed in its established vertical height with the aid of the automatic spring signalling device and utilizing the wax bites to record the mandibular relations; and FIGURE 9 is a side elevational view on a reduced scale showing the mandibular relation recorder device after removal from the mouth and locked in closed position in readiness for the taking of measurements required in fabricating dentures.

Referring more particularly to FIGURES 1 and 2, there is shown a muscle conditioner and neurologic activator designated generally 10 and having important functions in carrying out the method and objectives of the present invention. Activator 10 includes a generally cylindrical main body 11 having rounded opposite ends 12, 12 each provided with a deep transverse groove 13 adapted to receive and seat over the alveolar ridges of the mouth following the removal of teeth. Body 11 is preferably formed of suitable resilient material as for example a suitable plastic or soft rubber, of such consistency as to flex readily upon the application of pressure by the usual masticating movement of the jaw. The vertical distance between the bottoms of transverse grooves 13 taken axially through the activator body is somewhat greater than the vertical distance between the adjacent rim edges of the upper and lower alveolar ridges 16 and 17 in the normal closed position of the jaw. In consequence, closing of the jaw against the activator as the jaw is moved through normal masticating operations deforms the activator and subjects the adjacent tissues to vigorous massaging. Thus, as will be apparent from a consideration of FIGURE 2, the closing of ridges 16 and 17 against the activator presses the central body of the activator causing the surrounding portions of the body to bulge radially outward as the side walls of transverse grooves 13 are pressed toward one another and firmly against the opposite lateral sides of ridges 16 and 17.

As will be appreciated, the pressure so periodically applied and relieved against these ridges is highly effective in stimulating blood flow and the circulation of nutrients present in the blood stream to the alveolar tissues. Furthermore, the repeated tensioning and relaxing of the muscle couplet elements in the neuro muscular system used when masticating promotes a greatly increased flow of blood through these muscles causing them to be supplied with abundant nutrients as they are exercised. It is pointed out that, as mastication continues, activator 10 is preferably shifted from place to place along ridges 16 and 17 making use of a short handle 19 secured to the central portion of the activator and protruding beyond the lips where it can be grasped by the user's fingers.

The activator preferably has a soft, smooth, impervious exterior easily kept in a sanitary condition and safeguarding against abrasion or injury to the delicate mouth tissues. The activator may be sterilized after each use without injurious effect to the resilient material and can be re-used over a long period of time.

In continuing the reconditioning of the neuro muscular system initiated by the use of the activator shown in FIGURES 1 and 2, use is made of artificial bolus in lieu of food because of the greater control, uniformity and the accurate measurements and other definite advantages of bolus. The pieces of bolus shown in FIGURE 4 are representative of a wide range of thicknesses in which these pieces are provided, the pieces being molded, blanked or otherwise formed from stock of soft, spongy material, such as a suitable elastomer or plastic material. Three different thicknesses are illustrated by way of example in FIGURE 4 and are there designated 27A, 27B and 27C. It will be understood, however, that the full range of sizes includes a considerable number of pairs of identical blocks, each having the same configuration and parallel flat opposite faces. In a preferred form, the individual blocks are oval in shape and have a smooth, impervious outer surface. The constituent material is one adapted to be repeatedly sterilized without adverse effect as respects the resiliency, surface texture, strength and resistance to breakdown by repeated mastication to which the bolus is subjected in use.

The thickness of each bolus is so selected that when subjected to a predetermined pressure between its opposite flat faces it will be compressed to a definite predetermined thickness varying by a known small increment from the similarly determined thickness of pairs of bolus blocks of the next higher and next lower size. Accordingly, in use it is a simple matter for the patient to place closely related sizes of bolus in the mouth and to discriminate readily between the sizes which are found comfortable and those which are uncomfortable when masticating. By this procedure, it is a simple matter for the patient to eliminate the uncomfortable sizes and thereafter to masticate using a pair of bolus of the proper size in continuing further reconditioning and activation of alveolar structure and the muscle couplets associated therewith. Likewise, it will be understood that the proper size of bolus is employed in taking accurate record of the correct and true mandibular relations. The manner in which this is done will now be described, reference being had to FIGURES 5 to 9.

To make accurate recordings of the true mandibular relations following reconditioning of the neuro muscular complex, use is made of a pair of companion lower and upper base plates or trays 23, 24 of the type illustrated in FIGURE 3. These plates are of generally conventional configuration and construction comprising a plastic or metal body having the general configuration shown.

The crowned portions of each plate are then provided with flat wax bite rims 26, 26 of relatively hard wax or other suitable material distributed as shown, which wax adheres firmly to the surfaces of the base plates. The juxtaposed surfaces of bite rims 26 are finished to lie generally parallel to one another when the plates are positioned on the alveolar ridges, care being exercised that these facing surfaces are definitely spaced from one another sufficiently to provide room for the bolus in the normal masticating position of the jaw.

The plates 23, 24 are then placed in the mouth as shown in FIGURE 5 and the patient tries to masticate different size pieces of bolus 27 while the latter are positioned between bosses or bite rims 26, 26, the object being to determine with certainty the particular size which can be accommodated comfortably. It will be understood that a pair of the proper size piece of bolus is preferably used simultaneously in making the final determination, with one piece being located between wax rims 26 on either side of the mouth. If the patient can chew both comfortably simultaneously assurance is provided of the accuracy of the bolus size selection.

Thereafter a hard wax boss 29 is applied to the forward central portion of lower plate 23 and a pair of vertically threaded stylus posts 30 are adjustably seated in boss 29 by means of nuts 31 firmly anchored in the boss. The wax beneath the openings in nuts 31 is removed sufficiently to permit vertical adjustment of stylus 30 without interference from the wax forming boss 29. Stylus 30 are adjusted so that their upper free ends terminate short of contact with the juxtaposed surface of upper plate 24 when the jaw is closed to its proper vertical height. It will be understood that the projection of posts 30 above plate 23 is not critical so long as the free ends of posts 30 terminate appreciably below the point of actual contact with upper plate 24.

In order to determine the true vertical distance between the free ends of posts 30 and plate 24, use is made of a block of soft impression wax 33 applied to the downwardly facing portion of plate 24 in the position made clear by FIGURES 6, 7 and 8. The surface 34 of this wax is finished to lie generally parallel to the corresponding surface of lower boss 29 and in spaced relation thereto such that there is no danger of actual contact of surface 34 with the upper surface of boss 29 when the jaw is closed for comfortable mastication of the selected comfortable bolus. It is important that surface 34 lie appreciably below the upper ends of posts 30 when the jaw is so closed in order that a pair of impressions 35, 35 (FIGURE 7) will be formed in impression wax 33 during the mastication of the proper selected bolus recording of the mandibular relations in the manner to be more fully described presently.

Before plates 23 and 24 are placed in the mouth to record the mandibular relations it is desirable to attach a pair of automatic indicator devices to either lateral side of one of the base plates which are effective to provide the patient with a definite sensory indication when the jaw is closing precisely to the correct vertical height and other mandibular relations.

Indicators 38 comprise a pair of coil springs 39 having one end anchored to the opposite sides of the lower base plate 23 as by a blob of hard wax 40. The projection of the free end of these springs above the surface of plate 23 is critical, this height bearing a carefully predetermined relation to the thickness of a bolus 27 found by the patient to provide comfortable masticating conditions when the bolus is located between plates 23 and plates 24 in the usual masticating relations employed by the patient. Stated differently, the proper height for springs 38 in their installed condition on plate 23 is accurately related to the thickness of a pair of identical bolus 27 providing comfortable mastication, it being pointed out that the stiffness of springs 39 corresponds to that provided by the bolus under masticating pressure.

The resilient masticating height indicators 38, 38 having been installed on plate 23, the dentist is ready to record the mandibular relations. The first step is to install plates 23 and 24 on the respective alveolar ridges 16 and 17 following which a pair of blocks 42, 42 of heated soft bite wax are anchored to lower bosses 26, 26 of plate 23. After ascertaining that base plates 23 and 24 are accurately and firmly seated, the patient is asked to close the jaw slowly and steadily toward a comfortable vertical and median centric occlusal relation. In particular, the patient is cautioned to close until he senses definite contact of the stylus in the created pattern 35 in the impression wax 33 as well as contact with springs 38 bilaterally on the opposite sides of the jaw. The patient having made certain that spring indicators 38, 38 are under substantially equal comfortable pressure comparable to diastolic blood pressure and in position previously recorded by him to provide comfortable mastication when using the artificial bolus, he holds the jaw steadily in this position until the wax bite 42, 42 takes a firm set.

The dentist then has a complete and thoroughly accurate physical record of the true vertical distance between all vertically aligned segments and as well as all mandibular relations of plates 23, 24.

The next step is to remove indicator devices 38, 38 and to assemble plates 23, 24 in the position shown in FIGURE 9 with the upper ends of posts 30 seated accurately in impressions 35, 35 made thereby. The dual impressions 35 in cooperation with the pair of rigid posts 30 serve to orient the two plates relative to one another. In addition, the pair of bosses 26, 26 on upper plate 24 rest directly on the wax bite on surfaces 44, 44 formed during the taking of the mandibular relations. It will therefore be seen that plate 24 is firmly supported at four points and is accurately orientated in all directions with lower plate 23. Preliminary to the positioning of plates 23, 24 it is preferable to remove spring indicators 38, 38 to prevent interference in the assembly of the plates and the taking of measurements for the denture components.

Plates 23 and 24 are rigidly anchored in the described assembled position by means of three rigid U-shaped links 45, 45. The parallel legs of each link are rigidly anchored to the lateral surfaces of plates 23, 24 as by means of heat softened hard wax 46, it being understood that one pair of links 45 is secured between the opposite rear corners of plates 23, 24 whereas the third link is secured across the forward central portion of these plates in the manner clearly illustrated in FIGURE 9. Once the plates have been accurately anchored together in the manner described, the dentist or a technician may secure these bases to an articulator or recorder device of known type to maintain the mandibular relations.

Although the above described muscle reconditioning and revitalizing operations, together with the other techniques and recording devices employed in securing accurate measurements of the mandibular relation for true and comfortable mastication, have been described for a patient lacking all teeth, it is pointed out and emphasized that the same or slightly modified techniques and apparatus are equally suitable for use where some only of the teeth are missing. In the latter case it is merely necessary to modify portions of the recorder apparatus suitably for use in the restricted area from which teeth are missing. This is true even though all teeth are present on one or the other jaw. In this connection it is pointed out that massage and exercise of the neuro muscular system and of the tissues surrounding the area of the missing tooth or teeth is always important since atrophy begins immediately following loss of a tooth and progresses rather rapidly. It is followed at an early stage by the onset of degrees of dystrophy. In consequence, accurate vertical measurements cannot safely be made until the affected muscle couplets and neuro muscular system and associated tissue have been revitalized and restored to as near a normal healthy condition as possible.

It is also pointed out that though the muscle conditioner and neurologic activator shown in FIGURES 1 and 2 is particularly designed for use where a considerable number of teeth are missing, it is to be recognized that the size and shape of the resilient body of this device may be varied and reduced in size to accommodate a lesser number of missing teeth and can even be formed at one end to nest over teeth of one jaw with the other end shaped to straddle the area lacking teeth on the opposite jaw, the axial length of the activator being reduced suitably so that closing of the jaw with the device in place is effective to massage the area from which the teeth are missing.

While the particular physiologic method and apparatus for determining mandibular relations herein shown and disclosed in detail is fully capable of attaining the objects and providing the advantages hereinbefore stated, it is to be understood that it is merely illustrative of the presently preferred embodiments of the invention and that no limitations are intended to the details of construction or design herein shown other than as defined in the appended claims.

I claim:

1. That physiologic method of determining mandibular relations preliminary to the fabrication of dentures which comprises restoring normal muscle tone and neurologic conditions by inserting an artificial resilient load device against the alveolar ridge in the area of missing teeth and massaging this alveolar ridge area as the jaw operates to masticate said resilient load to thereby exercise elements of the neuromuscular mechanism associated with the area lacking teeth and to promote vigorous blood flow and the supply of nutrients to these areas, periodically repeating the foregoing manipulative steps until conditions of dystrophy and atrophy have been substantially corrected, proceeding to measure the specific mandibular relation for the particular patient by fitting base plates to the upper and lower alveolar ridges of the patient, placing different size bolus in the mouth to enable the patient to determine the size bolus masticated most comfortably, securing at least one resilient height indicator to one of said base plates and projecting toward the other base plate a distance accurately equivalent to the mastication diameter of the proper size bolus, whereby closing of the jaws in opposition to said resilient indicator will be sensed by the patient when the jaws are closed in their normal and proper masticating position.

2. That method defined in claim 1 characterized in the additional steps of making wax bites of the vertical distance between said base plates at points to either side of said resilient indicator, said bites being taken under the control of the patient as he holds the jaws steady and closed in their comfortable masticating relations by sensory information provided by said resilient indicator.

3. That method defined in claim 1 characterized in the additional steps of making wax impressions indicative of the proper mandibular relation while the jaws are held normally closed by the patient with sensory information provided to the patient by said resilient indicator.

4. That physiologic method of determining mandibular relations preliminary to the fabrication of dentures which comprises restoring normal muscle tone and neurologic conditions by inserting an artificial resilient load device against the alveolar ridge in the area of missing teeth and massaging this alveolar ridge area as the jaw operates to masticate said resilient load to thereby exercise elements of the neuromuscular mechanism associated with the area lacking teeth and to promote vigorous blood flow and the supply of nutrients to these areas, periodically repeating the foregoing manipulative steps until conditions of dystrophy and atrophy have been substantially corrected, proceeding to measure the specific mandibular relation for the particular patient by fitting rigid base plates to the upper and lower alveolar ridges of the patient, allowing the patient to masticate different size bolus until the size for comfortable mastication is found, and then making accurate multiple impressions representative of the vertical separation and relationship of said base plates for comfortable mastication while using resilient separator means between the opposite lateral sides of said base plates.

5. In combination, a pair of base plates adapted to be supported on the upper and lower alveolar ridges of a patient being measured for the fabrication of dentures, a resilient height indicator including a spring, means anchoring one end of said spring to one of said base plates with its other end extending vertically toward the other of said base plates, said spring and the anchorage therefor having a combined vertical height corresponding to the vertical distance between said base plates whereby when the jaws on which the same are to be mounted are closed in normal masticating position, said indicator is then under slight compression and effective to provide a sensory signal to the patient that the jaw is closing in a comfortable and equitable manner.

6. In combination with a pair of companion base plates adapted to be supported on the upper and lower alveolar ridges of a patient for denture measurements, that improvement which includes opposed bosses secured to the opposed rear end portions of said plates, soft masses of wax supported on the rear end portions of two of said bosses along the opposite sides of said base plates to facilitate making wax bites indicative of the relative positions of said plates when the jaw is in its proper vertical dimension and in its median occlusal centric relation, a mass of soft wax mounted on the forward ridge portion of one of said base plates, and means between the opposed forward portions of the other of said plates supporting at least one vertically adjustable post adapted to make an impression in said last mentioned mass of soft wax, whereby the vertical distance at three spaced and vertically aligned points is obtainable and represents the true positions of said plates relative to one another in the normal masticating position of the jaw.

7. The combination defined in claim 6 characterized in the provision of a pair of resilient means positioned between said base plates on the opposite lateral sides thereof and effective in providing the patient with a positive indication when the jaw is properly closing in normal and comfortable relation thereby enabling the patient to maintain the jaw in this position while the wax bite is taking a set.

8. The combination defined in claim 6 characterized in that said means between the forward portions of said plates supports two vertically adjustable posts offset from one another laterally to either side of the forward centers of said plates and cooperable with the wax bite material between the rear ends of said plates in determining the true relative relations of the said plates when the jaw is in its proper vertical dimension and its median occlusal centric relation.

9. The combination defined in claim 6 characterized by the provision of three rigid links having a length greater than the distance between said plates, and means securing said links to said base plates while the same are being used by the dentist in fabricating dentures for the patient.

References Cited by the Examiner

UNITED STATES PATENTS

| | | | |
|---|---|---|---|
| 1,714,029 | 5/1929 | Kuhn. | |
| 1,931,804 | 10/1933 | Sanborn | 32—2 |
| 2,172,998 | 9/1939 | Grout | 128—62 |
| 2,196,284 | 4/1940 | Ackerman | 128—62 |
| 2,249,721 | 7/1941 | Morris | 128—62 |
| 2,284,200 | 5/1942 | Gruss | 128—62 |
| 2,418,648 | 4/1947 | Kile | 32—19 |
| 2,674,797 | 4/1954 | Skinner | 32—19 |
| 2,708,789 | 5/1955 | Opotow | 32—19 |
| 2,746,150 | 5/1956 | Needles | 32—19 |
| 2,770,881 | 11/1956 | Lodi | 32—4 |

RICHARD A. GAUDET, *Primary Examiner.*

J. R. KLINE, H. B. WHITMORE, R. J. HOFFMAN, ROBERT E. MORGAN, *Examiners.*

N. YUDKOFF, L. W. TRAPP, *Assistant Examiners.*